(12) United States Patent
Somani

(10) Patent No.: US 10,153,688 B2
(45) Date of Patent: Dec. 11, 2018

(54) POWER SYSTEM AND METHOD OF STARTING MULTIPLE POWER CONVERTERS IN GRID FORMING MODE

(71) Applicant: DYNAPOWER COMPANY LLC, South Burlington, VT (US)

(72) Inventor: Apurva Somani, South Burlington, VT (US)

(73) Assignee: DYNAPOWER COMPANY LLC, South Burlington, VT (US)

(*) Notice: Subject to any disclaimer, the term of this patent is extended or adjusted under 35 U.S.C. 154(b) by 0 days.

(21) Appl. No.: 15/803,087

(22) Filed: Nov. 3, 2017

(65) Prior Publication Data

US 2018/0109111 A1   Apr. 19, 2018

Related U.S. Application Data

(63) Continuation of application No. 15/786,996, filed on Oct. 18, 2017.
(Continued)

(51) Int. Cl.
*H02M 1/36* (2007.01)
*H02J 3/38* (2006.01)
(Continued)

(52) U.S. Cl.
CPC ........... *H02M 1/36* (2013.01); *G05B 15/02* (2013.01); *H02J 3/38* (2013.01); *H02J 3/381* (2013.01);
(Continued)

(58) Field of Classification Search
CPC ....... H02J 2003/388; H02J 3/381; H02J 3/08; H02J 3/32; H02J 3/38; H02J 3/40; H02J 9/005; G06F 1/26
(Continued)

(56) References Cited

U.S. PATENT DOCUMENTS 9,401,663 B2 * 7/2016 Deboy ............... H02J 3/383
2009/0037030 A1 * 2/2009 Chidambaram ...... H02J 13/001
700/297
(Continued)

FOREIGN PATENT DOCUMENTS

WO   2015/090375 A1   6/2015

OTHER PUBLICATIONS

Niannian Cal et al; "A Hierarchical Multi-agent Control Scheme for a Black Start-Capable Microgrid", Published in: Power and energy Society General Meeting, 2011 IEEE, Jul. 24-29, 2011; pp. 1-7.
(Continued)

*Primary Examiner* — Chun Cao
(74) *Attorney, Agent, or Firm* — Ladas & Parry LLP

(57) ABSTRACT

A power system and method for performing a blackstart on a microgrid. The power system includes at least a first power converter and a second power converter. The first power converter comprises a first controller having a plurality of startup sequences for performing the blackstart. The second power converter is electrically coupled to the first power converter at a point of common coupling. During the blackstart, the first controller is configured to select and perform one of the plurality of startup sequences according to a point at which the second power converter is within the second power converter's startup sequence during the blackstart. The first controller selects the one of the plurality of startup sequences according to a microgrid voltage at the point of common coupling.

13 Claims, 5 Drawing Sheets

Related U.S. Application Data

(60) Provisional application No. 62/410,129, filed on Oct. 19, 2016.

(51) Int. Cl.
*G05B 15/02* (2006.01)
*H02J 13/00* (2006.01)

(52) U.S. Cl.
CPC ..... *H02J 13/0006* (2013.01); *H02J 2003/388* (2013.01)

(58) Field of Classification Search
USPC .................................................. 700/297, 298
See application file for complete search history.

(56) References Cited

U.S. PATENT DOCUMENTS

| | | | | |
|---|---|---|---|---|
| 2012/0327688 A1* | 12/2012 | Guthrie | ................ | H02M 3/285 363/15 |
| 2013/0049478 A1* | 2/2013 | Wagoner | ................ | H02M 1/36 307/82 |
| 2016/0241039 A1 | 8/2016 | Cheng et al. | | |

OTHER PUBLICATIONS

Written Opinion of the International Searching Authority dated Jan. 31, 2018; PCT/US2017/057289.

\* cited by examiner

POWER SYSTEM AND METHOD OF STARTING MULTIPLE POWER CONVERTERS IN GRID FORMING MODE

FIELD OF THE INVENTION

The present invention relates generally to a power system comprising a plurality of power converters; and more specifically, to systems and methods for starting multiple power converters in grid forming mode.

Background of the Invention

A power system may include distributed power sources (e.g., distributed generators, battery banks, and/or renewable resources such as solar panels or wind turbines to provide power supply to a grid (e.g., a microgrid having local loads and/or a utility grid). The power system may include a power converter, such as a power inverter, for converting power between a power source and a grid. Such power conversion may include AC/DC, DC/DC, AC/AC and DC/AC.

A microgrid system can include a variety of interconnected distributed energy resources (e.g., power generators and energy storage units) and loads. The microgrid system may be coupled to the main utility grid through switches such as circuit breakers, semiconductor switches (such as thyristors and IGBTs) and/or contactors. In the event that the microgrid system is connected to the main utility grid, the main utility grid may supply power to the local loads of the microgrid system. The main utility grid itself may power the local loads, or the main utility grid may be used in combination with the power sources of the microgrid to power the local loads.

A controller comprising hardware and software systems may be employed to control and manage the microgrid system. Furthermore, the controller may be able to control the on and off state of the switches so that the microgrid system can be connected to or disconnected from the main grid accordingly. The grid connected operation of the microgrid system is commonly referred to as "grid tied" mode, whereas the grid disconnected operation is commonly referred to as "islanded" or "stand alone" mode.

BRIEF SUMMARY OF THE INVENTION

Embodiments of the present invention include a power system and method for performing a blackstart on a microgrid without the necessity of communication between the power converters of the power system.

In one aspect, a power system for performing a blackstart on a microgrid includes a first power converter comprising a first controller having a plurality of startup sequences for performing the blackstart; and a second power converter electrically coupled to the first power converter at a point of common coupling. During the blackstart, the first controller is configured to select and perform one of the plurality of startup sequences according to a point at which the second power converter is within the second power converter's startup sequence during the blackstart, and the first controller selects the one of the plurality of startup sequences according to a microgrid voltage at the point of common coupling.

The second power converter may comprise a second controller having the plurality of startup sequences, with the second controller being configured to control the second power converter to perform one of the plurality of startup sequences such that the first controller can synchronize with the second controller during the blackstart according to the microgrid voltage.

The first controller may be configured to select a first startup sequence when the microgrid voltage is less than a first predetermined voltage threshold. In performing the first startup sequence the first controller is configured to perform one or more of the following: close a first switch that is coupled between the first power converter and the point of common coupling; start gating of the first power converter; control a frequency of an output voltage of the first power converter to be a first predetermined frequency; ramp the output voltage level of the first power converter from substantially zero to a first predetermined voltage level over a first predetermined time period; hold the output voltage level at the first predetermined voltage level and hold the frequency of the output voltage at the first predetermined frequency for a predetermined dwell period; and ramp the output voltage level from the first predetermined voltage level to a nominal voltage level, and ramp the output voltage frequency from the first predetermined frequency to a nominal output voltage frequency over a second predetermined time period.

The first controller may also be configured to select a second startup sequence when the microgrid voltage is greater than a first predetermined voltage threshold and less than a second predetermined voltage threshold. In performing the second sequence the first controller is configured to perform one or more of the following: start phase lock loop synchronization to the microgrid voltage and a microgrid frequency; implement a first wait time for waiting unit the microgrid voltage has reached the first predetermined voltage threshold; start gating of the first power converter to output the first predetermined voltage threshold; ramp the output voltage of the first power converter from the first predetermined voltage threshold to a first predetermined voltage level over a remaining time period, the remaining time period being a portion of a first predetermined time period during which the second power controller finishes ramping its output voltage from substantially zero to the first predetermined voltage level; implement a second wait time for waiting a portion of a predetermined dwell period, the predetermined dwell period being a period during which the second power converter is holding its output voltage and frequency; close a first switch that is coupled between the first power converter and the point of common coupling; implement a third wait time for waiting a remaining portion of the predetermined dwell period; ramp the output voltage level from the first predetermined voltage level to a nominal voltage level, and ramp the output voltage frequency to a nominal output voltage frequency over a second predetermined time period.

The first controller may also be configured to select a third startup sequence when the microgrid voltage is greater than a third predetermined threshold. In forming the third sequence, the first controller is configured to perform one or more of the following: implement a wait time for waiting unit the microgrid voltage reaches a first predetermined portion of a nominal microgrid voltage; start phase locked loop synchronization to the existing microgrid voltage; determine whether the microgrid voltage and frequency are within predetermined limits of the nominal microgrid voltage and a nominal microgrid frequency; start gating of the first power converter and set output voltage of the first power converter to zero and frequency to nominal microgrid frequency; ramp the output voltage of the first power converter from zero to the microgrid voltage; close a first switch that is coupled between the first power converter and the point of common coupling.

The first controller may also be configured to select another third startup sequence when the microgrid voltage is greater than a third predetermined voltage threshold. In forming this particular third sequence, the first controller is configured to perform one or more of the following: catch an initial rising voltage and frequency of the second power converter; synchronize the first power converter with the existing rising voltage and frequency of the second power converter; close a first switch that is coupled between the first power converter and the point of common coupling; ramp the output voltage and frequency of the first power converter from the initial voltage and frequency over a remaining period of a final ramp of the second power converter.

In another aspect, a power system for performing a blackstart on a microgrid includes a first power converter electrically coupled to the microgrid and comprising a first controller configured to perform a plurality of startup sequences; and a second power converter electrically coupled to the microgrid. During a blackstart, the first controller is configured to select and perform one of the plurality of startup sequences according to a microgrid voltage, the plurality of startup sequences including a first start up sequence, a second start up sequence and a third startup sequence. The first controller may select the first startup sequence when the microgrid voltage is less that a first predetermined threshold voltage; select the second startup sequence when the microgrid voltage is greater than the first predetermined threshold voltage but less than a second predetermined threshold voltage; and select the third startup sequence when the microgrid voltage is greater than the second predetermined voltage.

The second power converter may comprise a second controller that is also configured to perform one of the plurality of startup sequences including the first startup sequence, the second startup sequence and the third startup sequence during the blackstart such that the first controller can synchronize with the second controller according to the microgrid voltage.

In an aspect, in performing the startup sequences, when the first controller controls the first power converter to perform the first startup sequence, the second controller has not begun one of the first startup sequence, the second startup sequence and the third startup sequence; when the first controller controls the first power converter to perform the second startup sequence, the second controller has begun the first startup sequence but has not surpassed a predetermined point of the first startup sequence; and when the first controller controls the first power converter to perform the third startup sequence, the second controller has begun the first startup sequence and has surpassed the predetermined point.

In performing the first sequence, the first controller may be configured to perform one or more of the following: close a first switch for coupling the first power converter to the microgrid; start gating of the first power converter; control a frequency of an output voltage of the first power converter to be a first predetermined frequency; ramp the output voltage level of the first power converter from substantially zero to a first predetermined voltage level over a first predetermined time period; hold the output voltage level at the first predetermined voltage level and hold the frequency of the output voltage at the first predetermined frequency for a predetermined dwell period; ramp the output voltage level from the first predetermined voltage level to a nominal voltage level, and ramp the output voltage frequency from the first predetermined frequency to a nominal output voltage frequency over a second predetermined time period.

In performing the second sequence, the first controller may be configured to perform one or more of the following: start phase lock loop synchronization to the microgrid voltage and a microgrid frequency; implement a first wait time for waiting unit the microgrid voltage has reached a predetermined portion of a first predetermined voltage level; start gating of the first power converter to output the predetermined portion; ramp the output voltage of the first power converter from the predetermined portion to a second predetermined voltage level for over a remaining time period, the remaining time period being a portion of a first predetermined time period during which the second power controller finishes ramping its output voltage from substantially zero to the second predetermined voltage level; implement a second wait time for waiting a portion of a predetermined dwell period, the predetermined dwell period being a period during which the second power converter is holding its output voltage and frequency; close a first switch that couples the first power converter to the microgrid; implement a third wait time for waiting a remaining portion of the predetermined dwell period; ramp the output voltage level from the second predetermined voltage level to a nominal voltage level, and ramp the output voltage frequency to a nominal output voltage frequency over a second predetermined time period.

In performing the third sequence, the first controller may be configured to perform one or more of the following: implement a wait time for waiting unit the microgrid voltage reaches a first predetermined portion of a nominal microgrid voltage; start phase locked loop synchronization to the existing microgrid voltage; determine whether the microgrid voltage and frequency are within predetermined limits of the nominal microgrid voltage and a nominal microgrid frequency; start gating of the first power converter and set output voltage of the first power converter to zero and frequency to nominal microgrid frequency; ramp the output voltage of the first power converter from zero to the microgrid voltage; close a first switch that couples the first power converter to the microgrid.

In performing the third sequence, the first controller may instead be configured to perform one or more of the following: catch an initial rising voltage and frequency of the second power converter; synchronize the first power converter with the existing rising voltage and frequency of the second power converter; close a first switch that couples the first power converter to the microgrid; ramp the output voltage and frequency of the first power converter from the initial voltage and frequency over a remaining period of a final ramp of the second power converter.

In another aspect, a method of performing a blackstart of a power converter coupled to a microgrid having at least one other power converter comprises: sensing a microgrid voltage; selecting one of a plurality of startup sequences according to the microgrid voltage, the startup sequences including at least a first startup sequence, a second startup sequence and a third startup sequence.

Selecting one of a plurality of startup sequences according to the microgrid voltage may include selecting the first startup sequence when the microgrid voltage is less that a first predetermined threshold voltage; selecting the second startup sequence when the microgrid voltage is greater than the first predetermined threshold voltage but less than a second predetermined threshold voltage; selecting the third startup sequence when the microgrid voltage is greater than the second predetermined threshold voltage; and controlling the power converter to perform the selected startup sequence.

In an aspect, the microgrid voltage being less that the first predetermined voltage indicates that the other power converter has not begun its first sequence.

When the first startup sequence is selected, controlling the power converter to perform the first startup sequence may include one or more of the following: closing a first switch for coupling the power converter to the microgrid; starting gating of the power converter; controlling a frequency of an output voltage of the power converter to be a first predetermined frequency; ramping the output voltage level of the power converter from substantially zero to a first predetermined voltage level over a first predetermined time period; holding the output voltage level at the first predetermined voltage level and holding the frequency of the output voltage at the first predetermined frequency for a predetermined dwell period; ramping the output voltage level from the first predetermined voltage level to a nominal voltage level, and ramping the output voltage frequency from the first predetermined frequency to a nominal output voltage frequency over a second predetermined time period.

When the second startup sequence is selected, controlling the power converter to perform the second startup sequence may include one or more of the following: starting phase lock loop synchronization to the microgrid voltage and a microgrid frequency; implementing a first wait time for waiting unit the microgrid voltage has reached a predetermined portion of a first predetermined voltage level; starting gating of the power converter to output the predetermined portion; ramping the output voltage of the power converter from the predetermined portion to a second predetermined voltage level for over a remaining time period, the remaining time period being a portion of a first predetermined time period during which the other power controller finishes ramping its output voltage from substantially zero to the second predetermined voltage level; implementing a second wait time for waiting a portion of a predetermined dwell period, the predetermined dwell period being a period during which the second power converter is holding its output voltage and frequency; closing a first switch that couples the first power converter to the microgrid; implementing a third wait time for waiting the remaining portion of the predetermined dwell period; ramping the output voltage level from the second predetermined voltage level to a nominal voltage level, and ramping the output voltage frequency to a nominal output voltage frequency over a second predetermined time period.

When the third startup sequence is selected, controlling the power converter to perform the third startup sequence may include one or more of the following: implementing a wait time for waiting unit the microgrid voltage reaches a first predetermined portion of a nominal microgrid voltage; starting phase locked loop synchronization to the existing microgrid voltage; determining whether the microgrid voltage and frequency are within predetermined limits of the nominal microgrid voltage and a nominal microgrid frequency; starting gating of the power converter and setting output voltage of the power converter to zero and frequency to nominal microgrid frequency; ramping the output voltage of the first converter from zero to the microgrid voltage; closing a first switch that couples the power converter to the microgrid.

When the third startup sequence is selected, controlling the power converter to perform the third startup sequence may instead include one or more of the following: catching an initial rising voltage and frequency of the other power converter; synchronizing the power converter with the existing rising voltage and frequency of the other power converter; closing a first switch that is coupled between the power converter and the microgrid; ramping the output voltage and frequency of the power converter from the initial voltage and frequency over a remaining period of a final ramp of the other power converter.

BRIEF DESCRIPTION OF THE FIGURES (NON-LIMITING EMBODIMENTS OF THE DISCLOSURE)

Other advantages of the present invention will be readily appreciated, as the same becomes better understood by reference to the following detailed description when considered in connection with the accompanying drawings, wherein.

DETAILED DESCRIPTION

Figure 1:
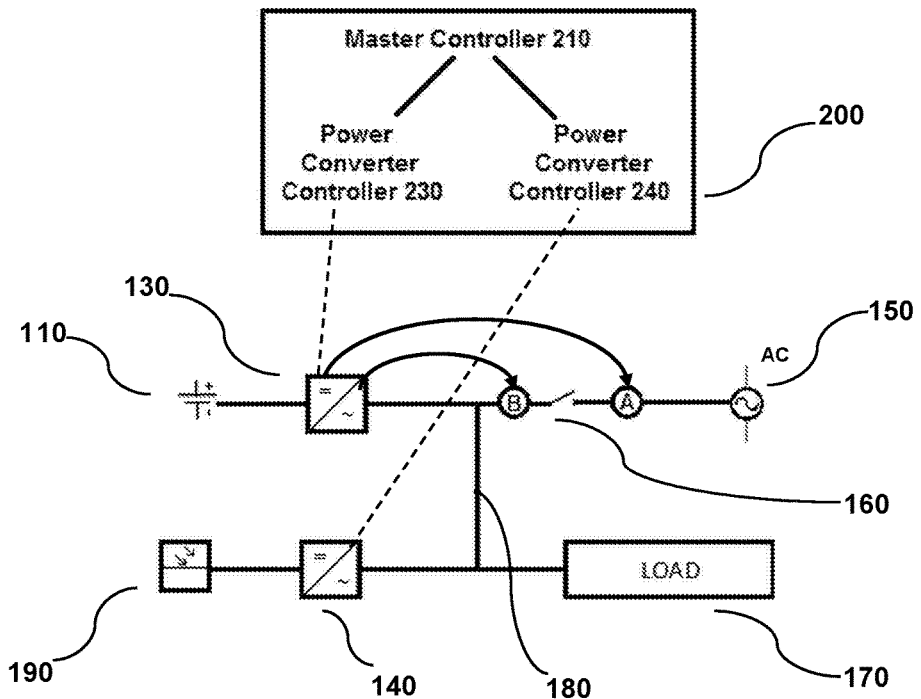
FIG. 1 shows an exemplary embodiment of a system for starting multiple power converters in microgrid mode.

Reference will now be made to the accompanying drawings, which form a part hereof, and which show, by way of illustration, specific exemplary embodiments. The principles described herein may, however, be embodied in many different forms. The components in the figures are not necessarily to scale, emphasis instead being placed upon illustrating the principles of the invention. Moreover, in the figures, like referenced numerals may be placed to designate corresponding parts throughout the different views.

In the following description of the invention, certain terminology is used for the purpose of reference only, and is not intended to be limiting. For example, although the terms first, second, etc. may be used herein to describe various elements, these elements should not be limited by these terms. These terms are only used to distinguish one element from another. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed terms. It will be further understood that the terms "comprises" and/or "comprising," when used in this specification, specify the presence of stated features, integers, steps, operations, elements, and/or components, but do not preclude the presence or addition of one or more other features, integers, steps operations, elements, components, and/or groups thereof.

Embodiments of the present invention includes systems and methods for starting a plurality of power converters (e.g., a power inverter) in grid forming mode (i.e., islanding mode) with a powered down grid (i.e., a black grid). Power converters (e.g., a bi-directional power inverter, DC/DC converter, AC/DC converter, etc.) are used in microgrid applications to convert power between a power source and a grid. The plurality of power converters may be connected to a microgrid that includes the power converters and one or more local loads. The microgrid may also include distributed energy resources other than the plurality of converters. The microgrid may, or may not, be capable of electrically connecting to a utility grid.

When the microgrid is connected to the utility grid, the microgrid may operate in a grid-tied mode in which the utility grid is electrically connected to and supplies power to (or receives power from) the microgrid and an islanding mode in which the utility grid is disconnected from the microgrid. When the microgrid is in an islanding mode, the power converters can be said to be in a grid-forming mode. In the grid-forming mode, the power converters—which are connected to power resources such as solar, wing etc., —assist in generating power to meet the electricity needs of the one or more local loads of the microgrid. The power converters interface with and control or "form" the microgrid. In grid-forming mode, the power converters control both voltage magnitude and frequency of the microgrid. Regardless of whether or not the microgrid is connected to the utility grid, in a powered down or black grid, no power is being supplied to the microgrid at the point in time at which the power converters desire to supply power to the loads (unlike, e.g., when the grid is transitioning from grid-tied to islanding mode).

When starting multiple power converters with a black grid (i.e., blackstart), certain issues arise. One issue is inrush current of transformers and any motor loads that may be connected to the microgrid. If a full voltage is instantaneously applied to a microgrid that is at rest or is black, a large amount of inrush current will be drawn by the microgrid from the source, which in this case is the plurality of power converters (e.g., power inverters). This in turn may end up tripping the power converters.

Another issue involved with starting multiple power converters with a black grid is the issue of synchronization. When starting a plurality of power converters to power the microgrid, the power converters should be controlled to be synchronized upon startup, so that the power converters don't push power back and forth between each other rather than supplying power to the local loads. One method of synchronizing the power converters (e.g., power inverters) is to provide the power system with a master controller that attempts to start all of the power converters at the same time with some synchronization between the inverters. However, this method has certain drawbacks. For example, synchronization by way of a master controller requires additional hardware, such as high speed digital lines (e.g., fiber or copper channels), to synchronize the power converters on a millisecond time basis.

Embodiments of the present invention provide a power system in which the plurality of power converters can be synchronized without the need for communication between the power converters or communication between the power converters and a master controller. In embodiments of the present invention, the power converters of a power system implement a voltage and frequency ramp upon startup. The same (or a similar) profile is programmed into (or received by) the controller of each of the power converters. The profile includes the parameters of the startup operation. The parameters may include certain set frequencies, certain set voltages, ramp times (i.e., a predetermined time during which the voltage or frequency is ramped from one level to another), and hold times for holding the voltage and/or the frequency in place for a predetermined time. In an embodiment, these values are all kept the same within each of power converters (i.e., the controller of each of the inverters is programmed with (or receives) the same parameters for performing the black start). Setting the parameters in this way allows the individual power converters to "look at" (or in other words, obtain) another power converters voltage to see if the other power converter has started. In an embodiment, the power converter may "look" at the other power converters voltage by, for example, checking for voltage at its own terminals or checking the voltage at the point of common coupling where the power converters are electrically coupled to each other. The power converter can discern whether the other power converter has started its blackstart sequence based on the other power converter's voltage. The power converter can then gauge, based on the magnitude/level of the other power converter's voltage, at what point the other power converter is within the other power converter's blackstart sequence.

FIG. 1 is an exemplary embodiment of a system for performing a blackstart on a plurality of power converters operating in grid forming mode (i.e., islanding mode) with a powered down grid (i.e., a black grid). In the embodiment shown in FIG. 1, the power converters 130 and 140 are bi-directional power inverters 130 and 140. However, it should be understood that the power converters 130 and 140 are not limited to power inverters and could be any combination of DC/DC converters, AC/DC converters, etc. Furthermore, FIG. 1 shows a first power converter and a second power converter for convenience only, and it should be understood that the power system 100 may include more than two power converters.

Referring to FIG. 1, a power system 100 according to an embodiment of the present invention may include power resources 110 and 190, power converters 130 and 140, external grid/AC source 150, disconnect/islanding switch 160, load 170, AC bus 180, control system 200, and sensors A and B.

In the embodiment illustrated in FIG. 1, the power resources 110 and 190 include a battery (or battery bank) 110 and a photovoltaic cell 190. The power converters 130 and 140 are bi-directional power inverters 130 and 140. The bi-directional power converters convert between DC and AC. Each of the power converters includes its own controller 230 or 240. The system may also include an optional master controller 210 that may communicate with the individual controllers 130 and 140 and receive readings from the sensors A and B. Sensor A takes readings, such as voltage magnitude, current magnitude, phase and/or frequency at the utility grid 150 side of the switch 160. Sensor B takes readings, such as voltage magnitude, current magnitude, phase and/or frequency at the point of common coupling 180. Each of the utility grid, the first and second power converters 130 and 140 and the load 170 are electrically coupled at the point of common coupling 180.

If an external grid 150 is provided, the external grid 150 may be the main utility grid, a separate grid segment of the microgrid, or even another AC or DC source connected to the microgrid. Disconnect 160 may be an islanding switch for electrically separating the microgrid from the external grid 150. The disconnect 160 may be, for example, a static disconnect switch, a motorized breaker, contactor, semiconductor AC switch, etc.

Load 170 represents the load that is actually consuming the energy. Load 170 is represented in FIG. 1 on the AC side but may also be a DC load.

The power converters are coupled together at a point of common coupling (PCC) 180 to share the load 170. In the embodiment illustrated in FIG. 1, the PCC is an AC bus. AC bus 180 interfaces with local load 170 on the microgrid.

In the embodiment illustrated in FIG. 1, the power converters 130 and 140 are power inverters coupled to DC power sources 110 and 190. However, it should be understood that the invention is not limited to power inverters or DC sources. For example, the power source 110 may be an AC source such as a wind turbine, and the power converter 130 or 140 may include an AC/DC converter coupled in series to an AC/DC power inverter between the wind turbine and the AC bus 180. Moreover, the microgrid equipment such as battery energy storage inverters, PV and wind systems, diesel generators, etc. may be directly coupled to the bus 180 or through isolation or autotransformers. Furthermore, some distributed assets, such as a wind turbine, may be an AC source and have an AC/AC converter where the input AC is from the turbine to the converter and the output AC connection is to the grid. Power sources 110 and 190 may be any DC source or combination of DC sources and AC sources. Examples of such other sources that may be used are generator(s), wind, PV (photovoltaic), fuel cell, compressed air storage, etc. Power converters 130 and 140 may thus be AC/DC, DC/DC, AC/AC or DC/AC.

Control system 200 may include a plurality of controllers and sensors that communicate with each other for synchronization and transition between grid-tied and microgrid modes. The control system may include a plurality of individual power converter controllers 230 and 240 each controlling one of the power converters of the power system 100. The control system 200 may also include an optional master controller 210 that is configured to coordinate between individual inverter controllers 230 and 240. The master controller 210 may be a separate site controller, may be one of the individual controllers of one of the power converters, or may be housed within one of the power inverters along with the power converter's individual controller. The controller of one or more of the individual power converters 230 or the master controller 210 may be configured to monitor voltage magnitude, current magnitude, phase and/or frequency at the utility grid 150 side of the switch 160 and the point of common coupling 180. Commercially available transducers may be used at sensors A and B to provide a signal to the control system for monitoring voltage magnitude, current magnitude, phase and/or frequency.

Figure 2:
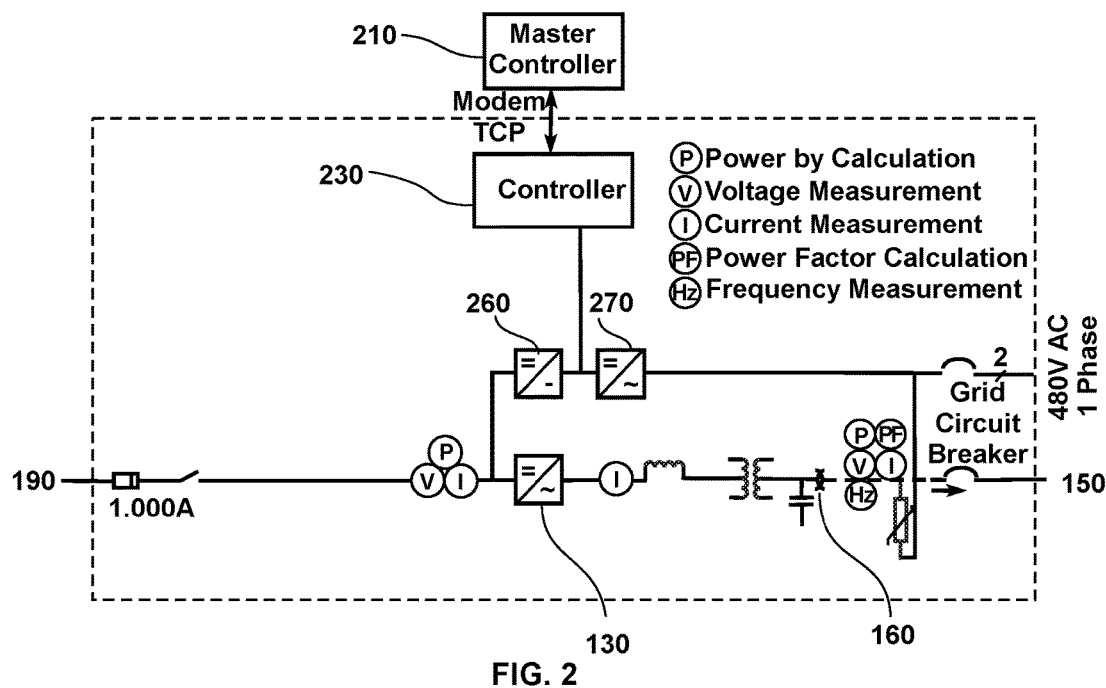
FIG. 2 shows an exemplary embodiment of a single power converter's connection to a controller and its control system.

FIG. 2 is a more detailed diagram of a single power converter's 130 control system. It should be noted that FIG. 2 does not show the connection of the second power converter 140, and is provided only to further illustrate the coupling of the control system of the power converter 130. In FIG. 2 controller 230 can receive readings from sensors P, PF, V, I Hz, where P is power by calculation, V is voltage magnitude measurement, I is a current magnitude measurement, PF is a power factor calculation, and Hz is a frequency measurement. The specific sensor layout of FIG. 1 is exemplary only, and as would be appreciated by a person of ordinary skill in the art, a different sensor orientation may be provided to obtain the necessary readings for controller 140 to carry out the present invention. The controller may receive power for its operation from a converter (DC to DC) 261 coupled to power source 110 or a converter (AC to DC) 270 coupled to an AC source. The optional master controller 210 is also illustrated in FIG. 2.

Referring again to FIG. 1, when operating in a grid-tied mode, islanding switch 160 is closed and energy from energy sources 110 and 190 are coupled with the grid 150. Energy from energy sources 110 and 190 may be used to provide power to the load 170 or additional generation to the utility/grid 150 to support other loads.

During a blackstart, the power converters 130 and 140 are disconnected from the grid 150 and begin operation from a powered down grid (i.e., black grid). In a blackstart condition, the power converters 130 and 140 are required to start up in a synchronized fashion to bring up a microgrid without any voltage source present or operational. The power converter 130 and 140 may receive start commands at different times due to differences in distance between their local controllers and the master controller, lack of time synchronous communication protocols, etc.

In embodiments of the present invention, the individual power converters 130 begin a blackstart sequence without the necessity of inter-unit communication. In embodiments of the present invention, the sequence performed by a first individual power converter 130 is dependent upon what point another second individual power converter system is within its own sequence. The first power converter may determine where the second power converter is within the second power converters sequence based on readings taken by sensor B. The readings may be taken directly by the first power converter's own controller 230, or the values may be received by the controller 230 from a master controller 210 which takes readings at sensor B.

In an embodiment, the startup sequence of an individual controller 230 may be one of a plurality of sequences, and the controller 230 determines which of the plurality of sequences to perform based on the voltage level (i.e. magnitude) at its own output terminal, which, in the embodiment shown in FIG. 1, is the microgrid voltage level sensed by sensor B at the point of common coupling 180.

Figure 3:
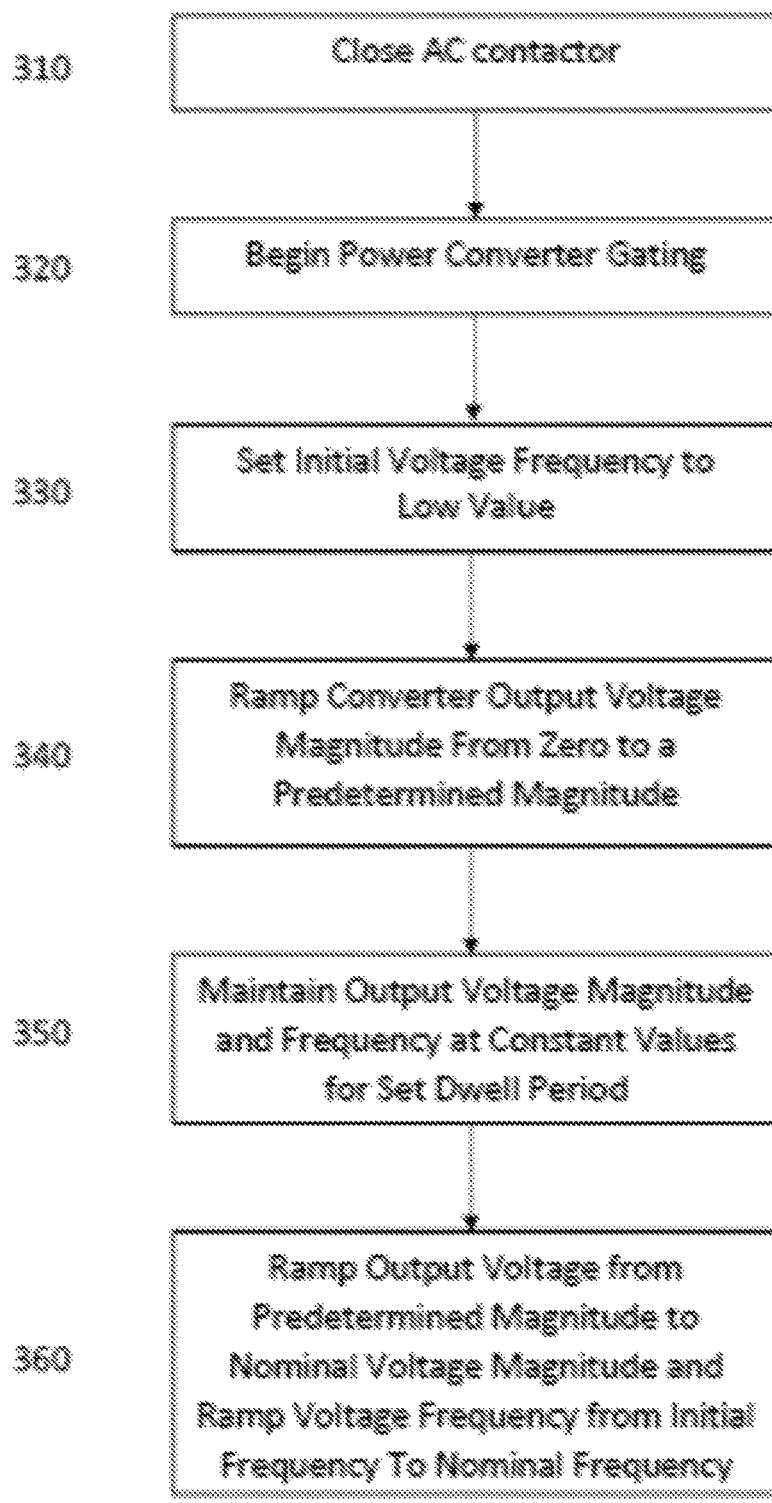
FIG. 3 is a flow chart illustrating a first start-up sequence according to an embodiment of the present invention.

FIG. 3 is a flow chart for illustrating the first sequence according to an embodiment of the present invention. The first sequence is performed by power converter 130 when there is essentially zero voltage on the microgrid. In an embodiment, there is essentially zero voltage on the grid when the output voltage detected by sensor B is less than 1 percent (0.01 per unit). The first sequence may include the following steps.

In step 310, an AC contactor is closed. The AC contactor is different from the islanding switch 160. The AC contactor is located between the point of common coupling 180 and the power converter 130, and the AC contactor disconnects the power converter 130 from the point of common coupling 180.

In step 320, power converter gating is started. The power converter 130 may include a plurality of switches for converting power from DC to AC, DC to DC, AC to DC, etc. In step 320, these switches begin receiving gating signals.

In step 330, the initial frequency reference is kept at a lower value. In an embodiment, the initial frequency reference may be 15 Hz for a 60 Hz system. The controller 230 controls the power converter 130 to output a voltage having a frequency that is the value of the frequency reference. Typically, there are rotational loads on the microgrid. The rotational frequency of any motor loads, or the rotational speed of any motor loads that are on the microgrid, is directly proportional to the frequency of the microgrid. Accordingly, by keeping the initial frequency at a low value in step 330, the rotational loads are started in a soft fashion, at a low speed. The speed can then be ramped up as the frequency is ramped.

In step 340, the output voltage of the power converter 130 is ramped up from essentially zero to a low value over a predetermined set time. In an embodiment, the magnitude of this low value may be 15% of the rated voltage (i.e., the nominal voltage magnitude) of the power converter, and the set time may be 1 second. Step 340 provides a reference for other power converters (e.g., second power converter 140) for synchronization. For example, first power converter 130 may receive a start command prior to other power converters (e.g., second power converter 140) due to, e.g., communication latencies or another reason. In step 340, at a fixed frequency, the output voltage of the first power converter 130 is ramped from zero to a low voltage magnitude, which gives a reference to the second power converter 140 that may receive a start command shortly thereafter. Consider, for example, the case in which only the first power converter 130 has received the start command, and the first power converter 130 starts ramping from zero to 15% of the rated voltage. If another second power converter 140 receives the start command when the first power converter 130 reaches 10% of the rated voltage, the second power converter 140 can then look at the output grid voltage (i.e., the voltage at the point of common coupling 180) using sensors and see that the microgrid voltage is at ten percent. Thus, the controller 240 of the second power converter 140 can know the point at which the first power converter 130 is within its startup sequence. The controller 240 of the second power converter 140 has knowledge of the startup profile of the first controller 13), because the controller 240 has received or has programmed therein the same profile. Thus, the second power converter 140 can know where the first power converter 130 is as the first power converter 140 is ramping its voltage to allow the second power converter 140 to start, in a synchronized fashion, with the first power converter 130.

In step 350, the output voltage magnitude and frequency are kept constant at 15% and 15 Hz for a set dwell period of time. In other words, the power converter 130 is performing a hold during a dwell period in step 350. Step 350 allows the second inverter (or second or third or multiple other inverters), which sensed the output voltage of the first inverter when the first inverter ramps from 0-15%, enough time to synchronize with the existing low voltage and low frequency.

In step 360, after the dwell period, the voltage and frequency are ramped together to the rated/nominal values over a predetermined set time. In an embodiment, the voltage is ramped from 15% of the rated voltage to 100% of the rated voltage, the frequency is ramped from 25%, 15 Hz to 100%, 60 Hz, and the predetermined set time is 4 s. However, it should be understood that the present invention is not limited to these particular values, and other values may be used in their place.

Throughout the first sequence, droop control is enabled to bring multiple inverters in synchronism.

The following control logic illustrates an embodiment in which the power converter 130 is performing the first sequence. The control logic is implemented by the controller 230 of the power converter 130.

```
while (state=ready)
  if cmd = start,
    state = starting
  endif
  if fault = true
    state = faulted
  endif
  if startconditionsmet = false
    state = notready
  endif
```

```
endwhile
while(state=starting)
  if outV < 0.01pu
    enable current_droop;
    disable power_droop;
    close KAC;
    setfreq = 15;
    setV = 0.0;
    AC_PWM = true;
    rampV(setV, 0.15, 1000);
    holdVF(0.15, 15, 1000);
    rampVF(0.15, 1, 15, 60, 4000)
    state = runningUF
    enable power_droop;
    disable current_droop;
```

In the above control logic, initially, the controller 230 determines that power converter 130 is ready to begin operation. 'if outV<0.01pu' refers to a determination as to whether the controller 230 is to perform the first sequence (i.e. if the controller 230 detects that the output voltage is substantially zero, the first sequence is performed). 'enable current_droop' and 'disable power_droop' disables the power droop and enables the current droop, so that the controller 230 performs a frequency droop based on output active current and a voltage droop based on output reactive current rather than performing droop based on active and reactive power. The reason for switching from a power droop to a current droop is that when ramping up, the output voltage is fairly low, because at the start of the sequence the output voltage is essentially zero. Thus, it is possible to supply a large amount of current to the microgrid but at a low voltage, which would mean that output power is low. To increase the effectiveness of droop based sharing characteristics, current is relied upon instead of power.

'setfreq=15' and 'setV=0.0' are the predetermined values for the initial frequency and output voltage magnitude of the power converter 130 to 15 Hz and 0.0 V, and 'AC_PWM=true' causes the power converter 130 to start gating. 'rampV(setV, 0.15, 1000)' ramps the output voltage of the power converter 130 from setV to V1 over 1000 ms. In this case, the setV is 0.0 and V1 is 15% of the rated output voltage of power converter 130. 'holdVF(0.15, 15, 1000)' holds the voltage magnitude and frequency at 15 percent and 15 Hz, respectively, for 1000 ms. 'rampVF(0.15, 1, 15, 60, 4000)' ramps the output voltage and frequency from 15 percent to 100 percent and 15 Hz to 100 Hz, respectively, over 4000 ms. 'state=runningUF' means the startup sequence is finished and the power converter 130 is in microgrid mode, powering local loads at nominal voltage and frequency. 'enable power_droop' and 'disable current_droop' disables the current_droop, which was performed during the startup sequence, and enables the power droop.

A second sequence is performed by power converter 130 when the power converter 130 detects a voltage present on the microgrid, and the detected voltage is lower than a predetermined low voltage level but is not essentially zero. This case will mean that one or more of the other inverters (e.g., the second power converter 140) have already started their start up sequence before the power converter 130 received its start command. This case may exist when the power converter 130 receives its start command shortly after one or more of the other inverters, which have already started their startup sequence using the first startup sequence described above (e.g. the second power converter 140 receives the start signal and begins the above-described first startup sequence prior to the point at which the first power converter 130 receives the start signal).

Figure 4:
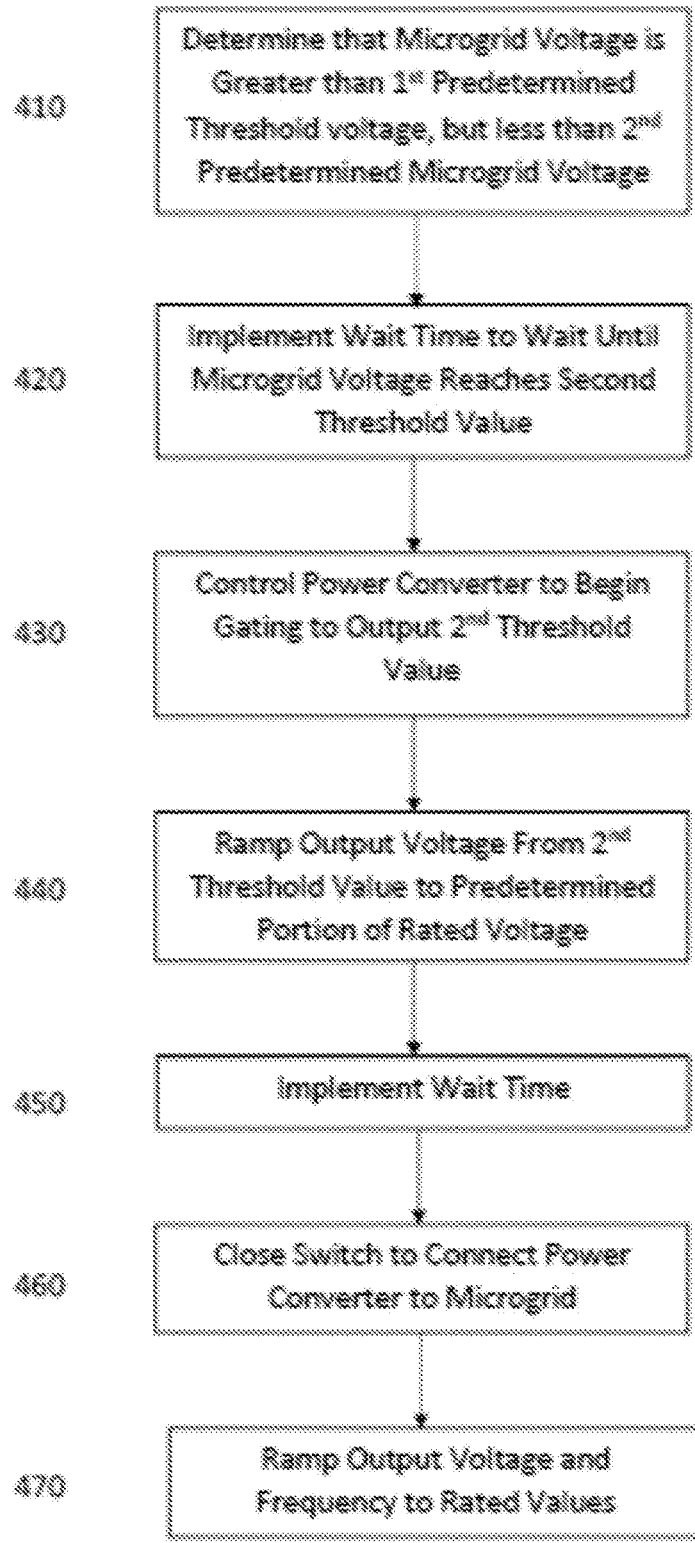
FIG. 4 is a flow chart illustrating a second start-up sequence according to an embodiment of the present invention.

FIG. 4 is a flow chart for illustrating the second sequence according to an embodiment of the present invention. The second sequence may include the following steps.

In step 410, the power converter 130 senses a microgrid voltage (i.e., the voltage at the point of common coupling), and the power converter 130 (i.e., the controller 230 of power converter 130) determines that the voltage is greater than a first predetermined threshold voltage but less than a second predetermined threshold voltage. In an embodiment, the first predetermined threshold voltage may be 1% of the rated (i.e. nominal) voltage of the power converter 230, and the second predetermined threshold voltage may be 12% of the rated voltage of the power converter 130. In this embodiment, the second predetermined threshold voltage of 12% is 80% of the voltage magnitude to which the power converter 130 is eventually ramped during this second startup sequence. Of course, it should be understood that values other than 12% and 15% may be selected. Thereafter, internal phase locked loop synchronization to the existing microgrid voltage, frequency and phase is started. The internal phase locked loop synchronization is the internal phase lock synchronization with the low voltage and low frequency present on the grid.

In Step 420, a wait time is implemented for waiting until the microgrid voltage reaches the second threshold voltage value (i.e. 80% of the 15% of rated voltage to which power converter 130 will be ramped. At this point the power converter 130 will know the point at which the second power converter 240 is in its startup sequence. For example, the first inverter 130 will know that the second inverter 140 is at 12%, because the first inverter 130 waited until the second inverter was at the second predetermined threshold value. The overall time it takes to ramp from 0-15% of rated voltage is also known, because the first power converter 130 has received (or has programmed therein) the same profile as the second power converter 140. In this case, 1000 milliseconds (or 1 second) is programmed as the period of time for the ramp, and the controller 230 can calculate how much of the 1000 milliseconds is remaining after reaching an output voltage 12% of rated voltage.

In step 430, the controller 230 controls the power converter 130 to begin gating. In this step, the controller 230 controls the power converter 130 to have an output voltage that is 12% of the rated voltage.

In step 440, the output voltage of the power converter 130 is ramped to 15% of rated voltage from 12% (i.e. 80% of 15%) of rated voltage. In step 440, the output voltage of the power converter 130 is ramped from 12% of rated voltage to 15% over the remaining time calculated by the controller 230 (e.g., 800 milliseconds).

In Step 450, a wait time is implemented by the controller 230 of the first power converter 130. The wait time of the first power converter 230 occurs at the same time as the dwell period of the second power converter 140 (which, in this case, is performing the first startup sequence) described in step 350 above. In an embodiment, the profile programmed in controller 230 calls for the wait time to be 500 milliseconds (i.e., half of the 1 second dwell period of step 350). The 500 millisecond wait time ensures that the voltage and frequency of the first power converter 130 will be synchronized with the second power converter 140, because it allows the first inverter to use the phase lock loop a sufficient amount of time to synchronize with the voltage and frequency generated by the second power converter 140.

In step 460, the AC contactor is closed so that the power converter 130 is connected to the microgrid. Because the first power converter and the second power converter are synchronized at this point, the closure of the AC contactor in step 460 will be a soft closure. The soft closure (connect) means that the AC voltage on each side of the AC contactor is matched in amplitude, frequency and phase. After the closure of the AC contactor, the controller 230 of the first power converter 130 waits for the remainder of the dwell period (i.e. 500 milliseconds), at which the controller 230 of the first power converter knows that it should begin ramping up.

In step 470, the output voltage and frequency of the power converter 430 are ramped together to the rated values over a predetermined time. In an embodiment, the output voltage and frequency are ramped from 15%, 15 Hz to 100%, 60 Hz over 4 s. Step 470 occurs at the same time as step 360, and thus, during the second power converter is ramping at the same time as the first power converter in step 470.

Throughout the second sequence, droop control is enabled to keep the plurality of inverters in synchronism.

The following control logic illustrates an embodiment in which the power converter 130 is performing the second startup sequence. This control logic may be implemented along with the first control logic (and the later described third control logic), so that the appropriate sequence is selected based on the microgrid voltage (i.e., the sensed voltage at the point of common coupling). The control logic is implemented by the controller 230 of the power converter 130.

```
elseif (outV>0.01pu and outV<0.12pu)
    enable current_droop;
    disable power_droop;
    start_sync;
    waittill(outV=>0.12pu)
    setV = outV;
    setfreq = 15;
    AC_PWM = true;
    trem = 1000*outV/0.15;
    rampV(setV, 0.15, trem);
    wait(500ms);
    close KAC;
    wait(500ms);
    rampVF(0.15, 1, 15, 60, 4000)
    state = runningUF;
    enable power_droop;
    disable current_droop;
```

In the above control logic, elseif (outV>0.01pu and outV<0.12pu) checks whether there is a voltage on the microgrid (i.e., a voltage at the point of common coupling) that is below a predetermined low voltage level. When a sensed microgrid voltage is between a first predetermined threshold voltage level (i.e. 1 percent of the rated voltage) and a second predetermined threshold value (i.e., 12 percent of the rated voltage) the second startup sequence is performed. enable current_droop and disable power_droop disables the power droop and enables the current droop, so that the controller 230 performs a frequency droop based on output active current and a voltage droop based on output reactive current rather than performing droop based on power. start_sync starts internal phase locked loop synchronization to the existing microgrid voltage and frequency. waittill (outV=>0.12pu) implements a wait time during which the power converter 130 holds until the microgrid voltage has reached a predetermined portion of the second threshold voltage value (i.e., 12% of rated voltage). setV=outV and setfreq=15 set the output voltage of the power converter 130 to the microgrid voltage and the frequency to 15 Hz, and AC_PWM=true causes the power converter 130 to start gating. trem=1000*outV/0.15 calculates the amount of time remaining in the ramp of the second power converter 140 (which is performing the first startup sequence) when the second power converter 140 is ramping from 0 to 15% of the rated voltage (see step 340 above). rampV(setV, 0.15, trem) ramps the output voltage of the power converter from the microgrid voltage to 15% of rated voltage over the calculated remaining time trem. wait (500 ms) implements a wait time, which ensures that the first inverter can use the phase lock loop for a sufficient amount of time to synchronize with the phase lock loop of the second power converter 140. close KAC instructs the AC contactor to close. wait (500 ms) waits the remainder of the dwell period (i.e. 500 milliseconds). rampVF(0.15, 1, 15, 60, 4000) ramps the output voltage and frequency of the power converter 130 from 15 percent to 100 percent and 15 Hz to 100 Hz, respectively, over 4000 ms. state=runningUF means the power converter 130 is in microgrid mode. enable power_droop and disable current_droop disables the current_droop, which was performed during the startup sequence, and enables the power droop.

A third sequence is performed by power converter 130 when one or more other inverters (e.g., the second power converter 140) have already started their start up sequence and have moved substantially along the startup sequence before the first inverter receives a start command. This case may exist when the first inverter receives its start command after the one or more other inverter(s) which have already started their startup sequence under sequence 1 or sequence 2. In one example in which the third sequence is utilized, a second power converter 140 is performing the first start up sequence, and the power converter 130 receives its start signal after the second power converter 140 has entered the dwell period and begun its hold (step 350). During the dwell period, the output voltage and frequency of the second power converter 140 are maintained at a constant level, and thus the microgrid voltage is at a constant level. Therefore, the controller 230 of the first power converter 130 cannot realize where the second power converter 130 is within the dwell period solely by sensing the microgrid voltage, because the microgrid voltage is at a constant level rather than being ramped. The following exemplary third sequence will be referred to as a first exemplary third sequence and may be used when another power converter has begun the first sequence and either within its hold period or beyond its hold period and performing its final ramp.

Figure 5:
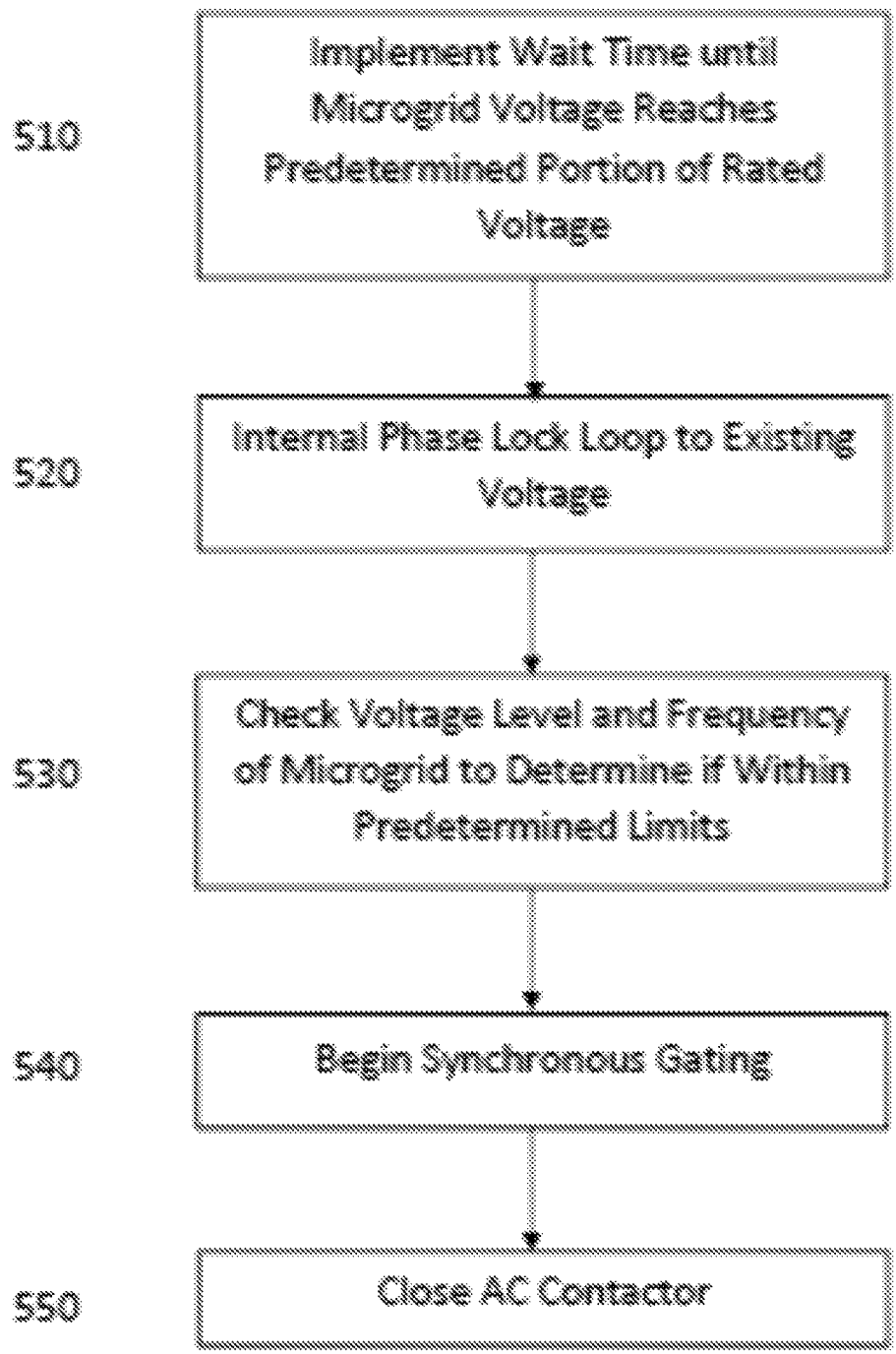
FIG. 5 is a flow chart illustrating a third start-up sequence according to an embodiment of the present invention.

FIG. 5 is a flow chart for illustrating the third sequence according to an embodiment of the present invention. The third sequence may include the following steps.

In step 510, a wait time is implemented until the microgrid voltage has reached a predetermined portion of the rated voltage. In an embodiment, the predetermined portion may be 85% of the rated voltage. At this point, the microgrid voltage is fairly close nominal operation of 100% of rated voltage at 60 Hz.

In step 520, internal phase locked loop synchronization to the existing microgrid voltage is started by the controller 230 of the power converter 130.

In step 530, the voltage level and frequency of the microgrid are checked to determine whether they are within predetermined limits. In an embodiment, the predetermined limits are 85% to 110% of the rated voltage and 60+/−5 Hz for the grid frequency.

In step 540, synchronous gating is started to imitate the microgrid voltage within the controller 230 of the first power converter 130. In step 540 the output voltage of the power converter 130 is initially set to 0V and the frequency is set to the nominal frequency 60 Hz.

The reason for setting the output voltage to zero and ramping it is for the power converter 130 itself to limit its internal transients. At this point, the AC contactor is still open, so any energization that the power converter 130 is performing is internal. The power converter 130 may, for example, be an inverter that includes transformers and capacitors as output filters within them. If a large voltage is applied to the power converter, there may a large level of inrush current within the inverter. Thus, the power converter 130 is preventing the supply of its own inrush current by ramping the voltage from 0 to the microgrid voltage.

In step 550, the AC contactor between the first power converter 130 and the point of common coupling 180 is closed so that the power converter 130 is electrically coupled to the microgrid. At this point, the first and second power converters 130 and 140 are operating in parallel.

In step 560, droop mode is enabled by the controller 130 of the power converter 130 to facilitate power sharing.

The following control logic illustrates an embodiment in which the power converter 130 is performing the first exemplary third startup sequence. This control logic implemented along with the first and second sequence control logic, so that the appropriate sequence is selected based on the microgrid voltage (i.e., the sensed voltage at the point of common coupling. The control logic is implemented by the controller 230 of the power converter 130).

```
else
    waittill(outV=>0.85pu)
    start_sync;
    waittill(outFreq<65 and outFreq>55)
    setfreq = outFreq;
    setV = 0;
    AC_PWM = true;
    rampV(setV, outV, 1000);
    close KAC;
    enable power_droop;
    state = runningUF;
endif
```

In the above control logic, else refers to the situation other than when the microgrid voltage (i.e., a voltage at the point of common coupling) is between the first predetermined threshold voltage level and the second predetermined threshold voltage level. In other words, this is the situation in which the sensed microgrid voltage is greater than 12% of the rated voltage. waittill (outV=>0.85pu) controls the power converter 130 to wait until the microgrid voltage has reached a predetermined portion of the rated voltage (in this case, 85% of rated voltage). start_sync starts internal phase locked loop synchronization to the existing grid voltage. waittill (outFreq<65 and outFreq>55) controls the power converter 130 to wait until the microgrid frequency is within limits of the nominal frequency (in this case 60+/−5 Hz). setfreq=outFreq sets the frequency of the power converter 130 to the microgrid frequency. setV=0 sets the output voltage of the power converter 130 to 0 V. AC_PWM=true starts synchronous gating to imitate the microgrid voltage within the first power converter 130. rampV(setV, outV, 1000) ramps the output voltage from 0 to the microgrid voltage over 1000 milliseconds. close KAC closes the AC contactor between the first power converter 130 and the point of common coupling 180. enable power_droop enables droop mode to facilitate power sharing among the power converters 130, 140. state=runningUF indicates that the state of the power converter 130 is microgrid mode.

In another second example of the third sequence, the first power converter 130 and its controller 230 may sense the microgrid voltage and frequency when another second power converter is performing the first sequence and is beyond the hold period. Thus, for example, the second power converter is ramping from 15% of rated voltage and 15 Hz to 100% of rated voltage and 60 Hz.

Figure 6:
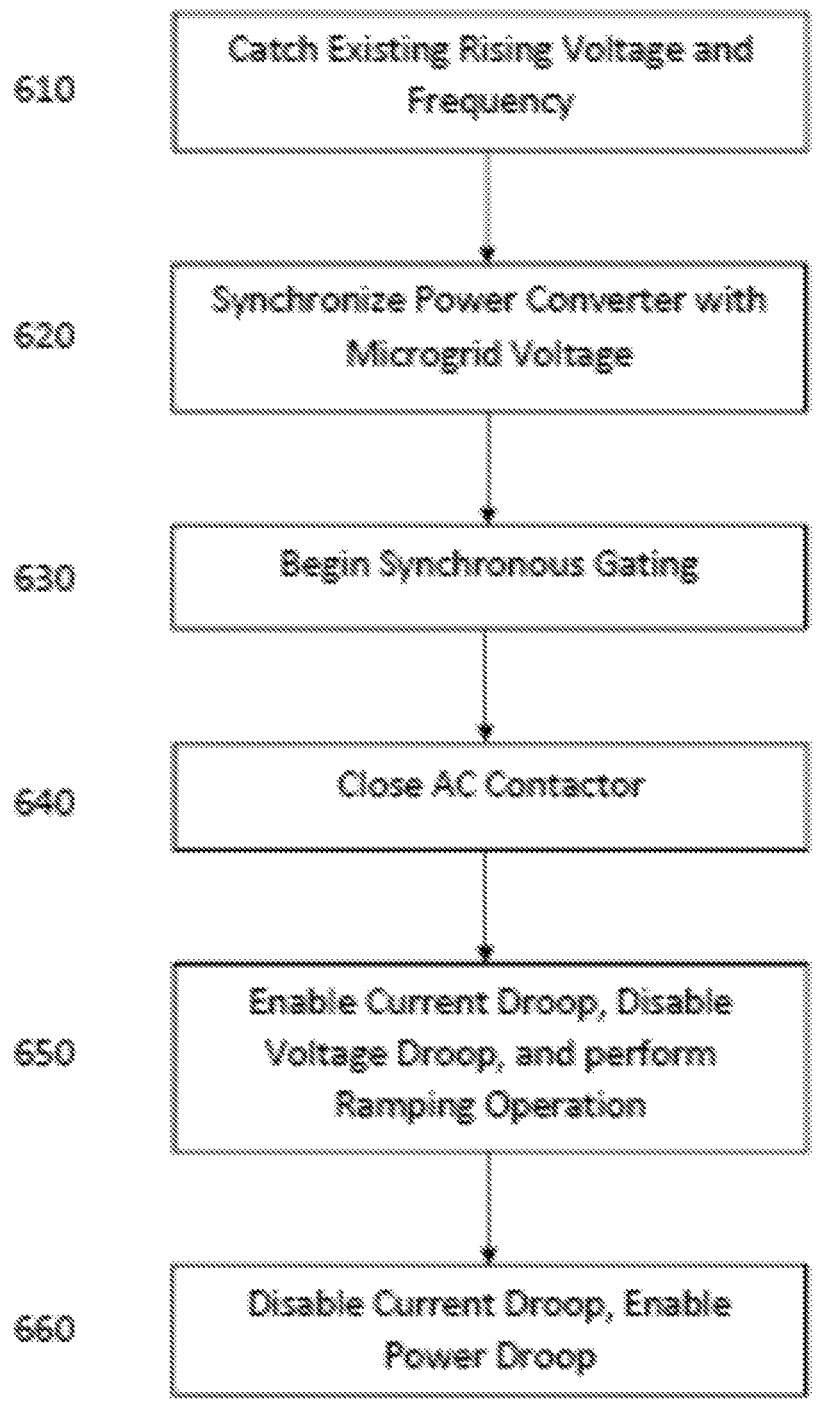
FIG. 6 is a flow chart illustrating a third start-up sequence according to another embodiment of the present invention.

FIG. 6 is a flow chart for illustrating the third sequence according to another embodiment of the present invention. The third sequence may include the following steps.

In step 610, the controller 230 of the first power converter 130 "catches" on to the existing rising voltage and frequency of the microgrid. The microgrid voltage and frequency is rising as the second power converter is performing its final ramp. Accordingly, the controller 230 of the first power converter can determine where the second power converter is at in its final ramp by sensing the microgrid voltage and frequency. This step is different from step 610 in the first exemplary third sequence in that instead of waiting for the microgrid voltage to reach the predetermined portion of the rated voltage (e.g., 85% of rated voltage), the controller 230 "catches" on to the existing rising voltage and closes in.

In step 620, the controller 230 synchronizes the power converter 130 with the microgrid voltage.

In step 630, synchronous gating is started to imitate the microgrid voltage within the first power converter 130.

In step 640, the AC contactor between the first power converter 130 and the point of common coupling 180 is closed so that the power converter 130 is electrically coupled to the microgrid. At this point, the first and second power converters 130 and 140 are operating in parallel.

In step 650, current droop is enabled and voltage droop is disabled, so that the controller 230 performs a frequency droop based on output active current and a voltage droop based on output reactive current rather than performing droop based on power. Once current droop is enabled, the controller 230 ramps the output voltage and frequency of the power converter 130 from the initial microgrid voltage and frequency sensed in step 610 over the remaining period of the final ramp of the second power converter.

The first and second power converters each have the same (or a similar) profile programmed into (or received by) its controller. Thus, the first controller 230 knows the slope of the final ramp (step 360 above) performed by the second power converter during the first sequence, the voltage at which the second power converter begins and ends the final ramp (e.g., begins at 15% of rated voltage and ends at 100% of rated voltage), and the amount of time that the second power converter takes to perform the final ramp (4s). The first controller also knows the output voltage of the second power converter, because the microgrid voltage sensed by the first controller is the output voltage of the second power converter. Accordingly, the first controller 230 can use the output voltage of the second power converter as well of its knowledge of the profile of the final ramp to calculate the time remaining in the final ramp (e.g., how much of the 4 s is left. The first controller 230 than controls the power inverter 130 to perform its ramp over this remaining time period, so that the first power converter is performing its ramp at the same time that the second power converter is performing its final ramp.

In step 660, once the voltage and frequency ramp is over, current droop is disabled and power droop is enabled.

The following control logic illustrates an embodiment in which the power converter 130 is performing the second exemplary third startup sequence. This control logic implemented along with the first and second sequence control logic, so that the appropriate sequence is selected based on the microgrid voltage (i.e., the sensed voltage at the point of common coupling). The control logic is implemented by the controller 230 of the power converter 130.

```
else
    start_sync;
    setfreq = outFreq;
    setV = outV;
    AC_PWM = true;
    close KAC;
    enable current_droop;
    disable power_droop;
    rampVF(Vout, 1, Fout, 60, 4000*(1-Vout));
    disable current_droop;
    enable power_droop;
    state = runningUF;
endif
```

In the above control logic, else refers to the situation other than when the microgrid voltage (i.e., a voltage at the point of common coupling) is between the first predetermined threshold voltage level and the second predetermined threshold voltage level. In other words, this is the situation in which the sensed microgrid voltage is greater than 12% of the rated voltage. In this embodiment, if the sensed microgrid voltage and frequency are the same as the microgrid voltage and frequency during the hold period of the second power converter, the first controller and power converter waits until the microgrid voltage starts its subsequent ramp (i.e., the final ramp of the second power converter, during which the microgrid voltage is ramped to nominal levels). start_sync starts internal phase locked loop synchronization to the existing grid voltage. setfreq=outFreq and setV=outV catches the output voltage and frequency of the second power converter, which is the same as the sensed microgrid voltage and frequency. AC_PWM=true starts synchronous gating to imitate the microgrid voltage within the first power converter 130. close KAC closes the AC contactor between the first power converter 130 and the point of common coupling 180. enable current_droop and disable power_droop disables the power droop and enables the current droop, so that the controller 230 performs a frequency droop based on output active current and a voltage droop based on output reactive current rather than performing droop based on power. rampVF(Vout, 1, Fout, 60, 4000*(1−Vout)) ramps the output voltage of the first power converter 130 from the microgrid voltage and frequency to the nominal voltage and frequency (i.e., 60 Hz, rated voltage) over the remainder of the 4000 ms ramp time of the second power converter. Here, Vout represents the percentage of the rated voltage of the output voltage outV of the second power converter. enable power_droop and disable current_droop disables the current_droop, which was performed during the startup sequence, and enables the power droop. state=runningUF means the power converter 130 is in microgrid mode.

For the control logic of the first through third sequences discussed above, current droop can be defined by the following equations:

$$Fout=Fnon-Kpf*VnomNout*(Vgrid*Id);$$

$$Vout=Vnom-Kqv*Vnom/Vout*(Vgrid*Iq).$$

Power droop can be defined by the following equations:

$$Fout=Fnom-Kpf*(Vgrid*Id);$$

$$Vout=Vnom-Kqv*(Vgrid*Iq);$$

In the above equations, Vout is applied voltage; and Vnom is nominal voltage. When current droop is enabled, the droop slopes are scaled by Vnom/Vgrid, which is higher than one (Vout<Vnom) during blackstart. When power droop is enabled, the droop slopes are not scaled. Vout*Id is a measure of output active power. Vout*Iq is a measure of output reactive power.

The above described embodiments are described as a microgrid connected to a utility grid as the external grid. However, it should be understood that the external grid is not limited to a utility grid. For example, the microgrid could be further segmented into multiple microgrids. Each of the microgrids would have an energy source (renewable, generators, storage) and a load. The microgrids could then re-connect and disconnect from/to each other as needed.

It will be apparent to those skilled in the art that various modifications and variations can be made to the disclosed power system without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

The invention claimed is:

1. A power system for performing a blackstart on a microgrid, the power system comprising:
   a first power converter electrically coupled to the microgrid and comprising a first controller configured to perform a plurality of startup sequences;
   a second power converter electrically coupled to the microgrid,
   wherein, during a blackstart, the first controller is configured to select and perform one of the plurality of startup sequences according to a microgrid voltage, the plurality of startup sequences including a first start up sequence, a second start up sequence and a third startup sequence, wherein, the first controller is configured to:
   select the first startup sequence when the microgrid voltage is less that a first predetermined threshold voltage;
   select the second startup sequence when the microgrid voltage is greater than the first predetermined threshold voltage but less than a second predetermined threshold voltage; and
   select the third startup sequence when the microgrid voltage is greater than the second predetermined voltage.

2. The power system according to claim 1, wherein the second power converter comprises a second controller that is also configured to perform one of the plurality of startup sequences including the first startup sequence, the second startup sequence and the third startup sequence during the blackstart such that the first controller can synchronize with the second controller according to the microgrid voltage.

3. The power system according to claim 2, wherein:
   when the first controller controls the first power converter to perform the first startup sequence, the second controller has not begun one of the first startup sequence, the second startup sequence and the third startup sequence;
   when the first controller controls the first power converter to perform the second startup sequence, the second controller has begun the first startup sequence but has not surpassed a predetermined point of the first startup sequence; and
   when the first controller controls the first power converter to perform the third startup sequence, the second controller has begun the first startup sequence and has surpassed the predetermined point.

4. The power system of claim 2, wherein, in performing the first sequence the first controller is configured to:
   close a first switch for coupling the first power converter to the microgrid;
   start gating of the first power converter;
   control a frequency of an output voltage of the first power converter to be a first predetermined frequency;
   ramp the output voltage level of the first power converter from substantially zero to a first predetermined voltage level over a first predetermined time period;
   hold the output voltage level at the first predetermined voltage level and hold the frequency of the output voltage at the first predetermined frequency for a predetermined dwell period;
   ramp the output voltage level from the first predetermined voltage level to a nominal voltage level, and ramp the output voltage frequency from the first predetermined frequency to a nominal output voltage frequency over a second predetermined time period.

5. The power system of claim 2, wherein, in performing the second sequence the first controller is configured to:
   start phase lock loop synchronization to the microgrid voltage and a microgrid frequency;
   implement a first wait time for waiting unit the microgrid voltage has reached a predetermined portion of a first predetermined voltage level;
   start gating of the first power converter to output the predetermined portion;
   ramp the output voltage of the first power converter from the predetermined portion to a second predetermined voltage level for over a remaining time period, the remaining time period being a portion of a first predetermined time period during which the second power controller finishes ramping its output voltage from substantially zero to the second predetermined voltage level;
   implement a second wait time for waiting a portion of a predetermined dwell period, the predetermined dwell period being a period during which the second power converter is holding its output voltage and frequency;
   close a first switch that couples the first power converter to the microgrid; implement a third wait time for waiting a remaining portion of the predetermined dwell period;
   ramp the output voltage level from the second predetermined voltage level to a nominal voltage level, and ramp the output voltage frequency to a nominal output voltage frequency over a second predetermined time period.

6. The power system of claim 2, wherein, in performing the third sequence the first controller is configured to:
   implement a wait time for waiting unit the microgrid voltage reaches a first predetermined portion of a nominal microgrid voltage;
   start phase locked loop synchronization to the existing microgrid voltage;
   determine whether the microgrid voltage and frequency are within predetermined limits of the nominal microgrid voltage and a nominal microgrid frequency;

start gating of the first power converter and set output voltage of the first power converter to zero and frequency to nominal microgrid frequency;
ramp the output voltage of the first power converter from zero to the microgrid voltage;
close a first switch that couples the first power converter to the microgrid.

7. The power system of claim 2, wherein, in performing the third sequence the first controller is configured to:
catch an initial rising voltage and frequency of the second power converter; synchronize the first power converter with the existing rising voltage and frequency of the second power converter;
close a first switch that couples the first power converter to the microgrid;
ramp the output voltage and frequency of the first power converter from the initial voltage and frequency over a remaining period of a final ramp of the second power converter.

8. A method of performing a blackstart of a power converter coupled to a microgrid having at least one other power converter, the method comprising:
sensing a microgrid voltage;
selecting one of a plurality of startup sequences according to the microgrid voltage, the startup sequences including at least a first startup sequence, a second startup sequence and a third startup sequence;
wherein selecting one of a plurality of startup sequences comprises:
selecting the first startup sequence when the microgrid voltage is less that a first predetermined threshold voltage;
selecting the second startup sequence when the microgrid voltage is greater than the first predetermined threshold voltage but less than a second predetermined threshold voltage; and
selecting the third startup sequence when the microgrid voltage is greater than the second predetermined threshold voltage; and
controlling the power converter to perform the selected startup sequence.

9. The method according to claim 8, wherein the microgrid voltage being less that the first predetermined voltage indicates that the other power converter has not begun its first sequence.

10. The method of claim 8 wherein when the first startup sequence is selected, controlling the power converter to perform the first startup sequence comprises:
closing a first switch for coupling the power converter to the microgrid;
starting gating of the power converter;
controlling a frequency of an output voltage of the power converter to be a first predetermined frequency;
ramping the output voltage level of the power converter from substantially zero to a first predetermined voltage level over a first predetermined time period;
holding the output voltage level at the first predetermined voltage level and holding the frequency of the output voltage at the first predetermined frequency for a predetermined dwell period;
ramping the output voltage level from the first predetermined voltage level to a nominal voltage level, and ramping the output voltage frequency from the first predetermined frequency to a nominal output voltage frequency over a second predetermined time period.

11. The method of claim 8, wherein when the second startup sequence is selected, controlling the power converter to perform the second startup sequence comprises:
starting phase lock loop synchronization to the microgrid voltage and a microgrid frequency;
implementing a first wait time for waiting unit the microgrid voltage has reached a predetermined portion of a first predetermined voltage level;
starting gating of the power converter to output the predetermined portion;
ramping the output voltage of the power converter from the predetermined portion to a second predetermined voltage level for over a remaining time period, the remaining time period being a portion of a first predetermined time period during which the other power controller finishes ramping its output voltage from substantially zero to the second predetermined voltage level;
implementing a second wait time for waiting a portion of a predetermined dwell period, the predetermined dwell period being a period during which the second power converter is holding its output voltage and frequency;
closing a first switch that couples the first power converter to the microgrid; implementing a third wait time for waiting the remaining portion of the predetermined dwell period;
ramping the output voltage level from the second predetermined voltage level to a nominal voltage level, and ramping the output voltage frequency to a nominal output voltage frequency over a second predetermined time period.

12. The method of claim 8, wherein when the third startup sequence is selected, controlling the power converter to perform the third startup sequence comprises:
implementing a wait time for waiting unit the microgrid voltage reaches a first predetermined portion of a nominal microgrid voltage;
starting phase locked loop synchronization to the existing microgrid voltage;
determining whether the microgrid voltage and frequency are within predetermined limits of the nominal microgrid voltage and a nominal microgrid frequency;
starting gating of the power converter and setting output voltage of the power converter to zero and frequency to nominal microgrid frequency;
ramping the output voltage of the first converter from zero to the microgrid voltage;
closing a first switch that couples the power converter to the microgrid.

13. The method of claim 8, wherein when the third startup sequence is selected, controlling the power converter to perform the third startup sequence comprises:
catching an initial rising voltage and frequency of the other power converter;
synchronizing the power converter with the existing rising voltage and frequency of the other power converter;
closing a first switch that is coupled between the power converter and the microgrid;
ramping the output voltage and frequency of the power converter from the initial voltage and frequency over a remaining period of a final ramp of the other power converter.

* * * * *